(No Model.)
H. N. RUTTAN.
ELEVATED CONDUIT FOR ELECTRIC WIRES.
No. 428,145.  Patented May 20, 1890.
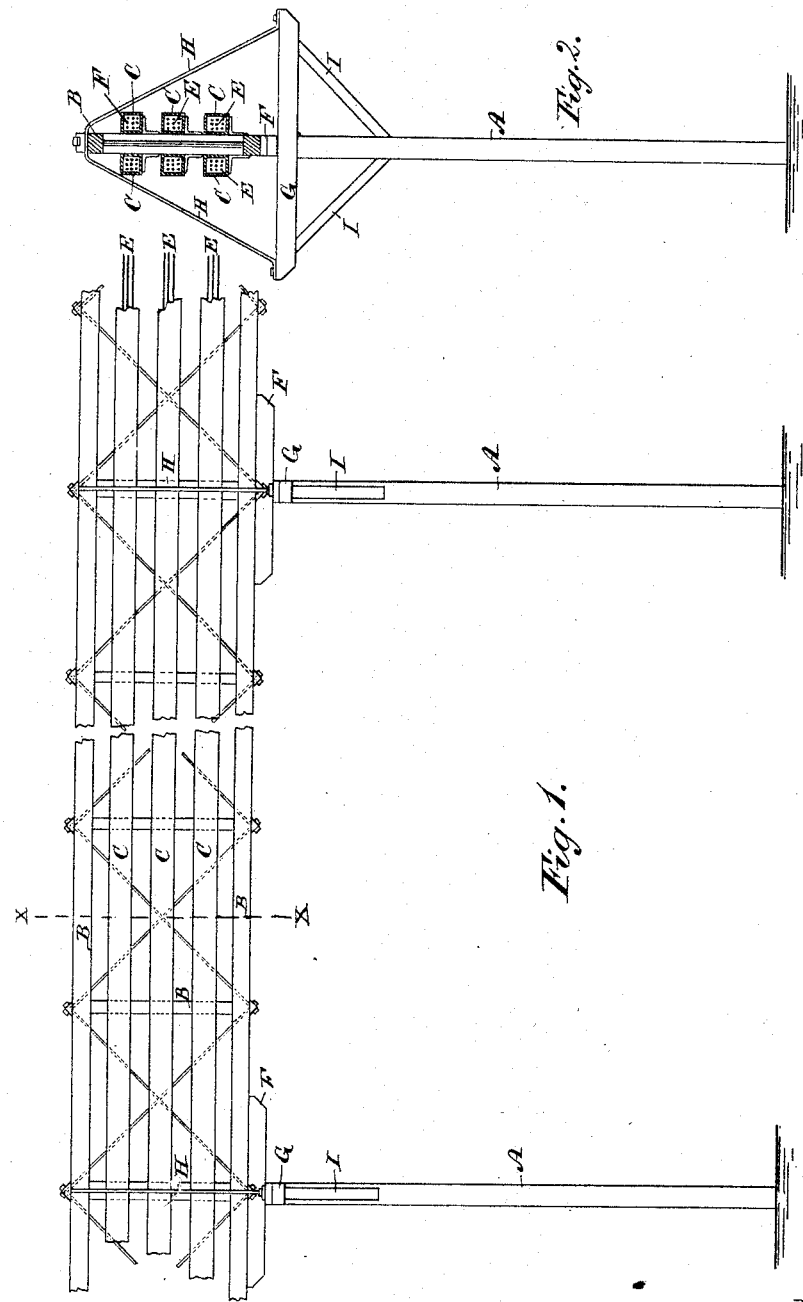
Witnesses:
John Grist
O. H. Horsey.
Inventor:
Henry N. Ruttan
By Henry Grist
Attorney.

UNITED STATES PATENT OFFICE.

HENRY N. RUTTAN, OF WINNIPEG, MANITOBA, CANADA.

ELEVATED CONDUIT FOR ELECTRIC WIRES.

SPECIFICATION forming part of Letters Patent No. 428,145, dated May 20, 1890.

Application filed January 22, 1890. Serial No. 337,757. (No model.)

*To all whom it may concern:*

Be it known that I, HENRY N. RUTTAN, of Winnipeg, in the Province of Manitoba, in the Dominion of Canada, have invented certain new and useful Improvements in Elevated Conduits for Electric Wires; and I do hereby declare that the following is a full, clear, and exact description of the same, reference being had to the accompanying drawings, in which—

Figure 1 is a side elevation of my improved conduit, and Fig. 2 is a cross-section of the same on line $x$ $x$.

My invention has for its object to provide a number of separate conduits attached to a truss-girder supported by posts, whereby a number of companies using the structure will have their line-wires under separate control, each company using a conduit in which to lay its wires.

My invention consists of a structure comprising a row of ground posts or piers supporting a truss-girder, and conduits attached thereto, the conduits arranged one above the other to carry electric wires inclosed therein, as hereinafter described.

A A are the ground-posts standing in a row at suitable distances apart, and B is a truss supported by the posts.

C are conduits secured horizontally to the girder in any suitable manner, one conduit placed above another and at convenient distance apart, as circumstances or need may require. The conduits, for cheapness of construction, may be made of boards nailed together to make three sides of a rectangular tube in a continuous manner, and provided with a suitable cover or top. The electric wires E are laid in the conduits, each company using the structure having the sole use of one or more conduits, whereby one company can obtain access to its own wires without interfering with the wires of another company using the other conduit or conduits. The wires are laid in the conduits in any suitable manner to be properly insulated. The girder preferably rests on a plate F, bearing on a cross-head G, on the top of each post, and secured by braces H from the cross-head to the upper cord and braces I from the cross-head to the post. When the number of conduits to be carried is greater than can be conveniently supported by one truss, two or more may be used.

I claim as my invention—

1. A structure to carry overhead electric wires, consisting of a truss-girder, supported by posts A, and one or more conduits C, secured to said girder, as set forth.

2. The combination, with the posts A, of the truss-girder B, supported by said posts, one or more conduits C, secured to the girder, and wires E, laid in the conduits, as set forth.

3. The combination of the posts A, truss-girder B, connecting said posts, conduits C, fastened to the girder, plate F, cross-head G, and braces H I, as set forth, for the purpose described.

HENRY N. RUTTAN.

Witnesses:
HENRY GRIST,
JOHN GRIST.